United States Patent
Jeong et al.

(10) Patent No.: US 6,628,944 B1
(45) Date of Patent: Sep. 30, 2003

(54) APPARATUS FOR CONSTRUCTING A ZONE DATA BASE FOR HOME ZONE SERVICE AND METHOD THEREFOR

(75) Inventors: Jae-Ho Jeong, Inchonkwangyok-shi (KR); Pyeong-Hwan Wee, Seoul (KR); Jae-Seong Bae, Kyonggi-do (KR); Hyun-Jung Park, Seoul (KR)

(73) Assignee: Samsung Electronics Co, LTD, Suwon (KR)

( * ) Notice: Subject to any disclaimer, the term of this patent is extended or adjusted under 35 U.S.C. 154(b) by 539 days.

(21) Appl. No.: 09/660,144

(22) Filed: Sep. 13, 2000

(30) Foreign Application Priority Data

Sep. 13, 1999 (KR) .......................... 1999-39029

(51) Int. Cl.[7] ............................ H04Q 7/20; H04B 7/155
(52) U.S. Cl. ...................... 455/433; 455/406; 455/407; 455/408; 455/422; 370/328
(58) Field of Search ................................ 455/406, 407, 455/408, 432, 436, 426, 3.1, 3.2, 433, 423, 424, 458, 405, 409, 446, 435; 379/111–114, 60; 700/292, 293; 370/328, 332, 318

(56) References Cited

U.S. PATENT DOCUMENTS

| | | | | | |
|---|---|---|---|---|---|
| 5,295,180 | A | * | 3/1994 | Vendetti et al. | 455/456 |
| 5,546,445 | A | * | 8/1996 | Dennison et al. | 455/408 |
| 5,561,841 | A | * | 10/1996 | Markus | 455/446 |
| 5,710,758 | A | * | 1/1998 | Soliman et al. | 370/241 |
| 5,774,802 | A | * | 6/1998 | Tell et al. | 455/408 |
| 5,862,203 | A | * | 1/1999 | Wulkan et al. | 379/114.02 |
| 5,937,004 | A | * | 8/1999 | Fasulo et al. | 375/224 |
| 5,960,356 | A | * | 9/1999 | Alperovich et al. | 455/458 |
| 6,014,565 | A | * | 1/2000 | Bonta | 455/437 |
| 6,107,961 | A | * | 8/2000 | Takagi | 342/357.13 |
| 6,201,957 | B1 | * | 3/2001 | Son et al. | 455/406 |
| 6,336,035 | B1 | * | 1/2002 | Somoza et al. | 455/446 |
| 6,415,148 | B1 | * | 7/2002 | Chiniga et al. | 455/434 |

* cited by examiner

Primary Examiner—Dwayne Bost
Assistant Examiner—Kamran Afshar
(74) Attorney, Agent, or Firm—Cha & Reiter

(57) ABSTRACT

A method for constructing a zone database for providing home zone services to the subscribers of a mobile communications system, comprises the steps of dividing a service area into a plurality of home service zones; simulating the communication coverage of the base stations for each of the home service zones; detecting the pilot signal strengths of the base stations; and, selecting a given number of the base stations in the order of pilot signal strength as the home zone.

12 Claims, 5 Drawing Sheets

APPARATUS FOR CONSTRUCTING A ZONE DATA BASE FOR HOME ZONE SERVICE AND METHOD THEREFOR

CLAIM OF PRIORITY

This application makes reference to and claims all benefits accruing under 35 U.S.C. Section 119 from an application for APPARATUS FOR CONSTRUCTING A ZONE DATA BASE FOR HOME ZONE SERVICE AND METHOD THEREFORE filed earlier in the Korean Industrial Property Office on Sep. 13, 1999 and there duly assigned Ser. No. 39029/1999.

BACKGROUND OF THE INVENTION

1. Field of the Invention

The present invention relates to an apparatus and method for constructing a zone database to provide home zone services to the subscribers of a mobile communications system.

2. Description of the Related Art

In a mobile communications system, a home zone service provides a different charging rate to a subscriber so that one of the charging rate is equivalent to an ordinary wired communication charge when the call is made within the home zone registered by the subscriber. For example, if the subscriber registers a specific area as his or her home zone with the mobile communications system, the air time charges can be charged at a significantly lower rate than normal. In order to establish the home zone specified by the subscriber, the mobile communication system collects location information (latitudes and longitudes) of the base stations, their respective communication coverage information, etc., based on the address specified by the subscriber. The present invention provides an improved apparatus and method for determining a charging rate for a call connection using a predetermined zone database.

SUMMARY OF THE INVENTION

It is an object of the present invention to provide an apparatus for constructing a zone database to identify the home zone for a call connection requested by a subscriber in a mobile communication system, and a method for providing the home zone services using the zone database.

According to an aspect of the present invention, a method for constructing a zone database for providing home zone services to the subscribers of a mobile communication system, comprising the steps of: dividing a service area into a plurality of home service zones; simulating communication coverage area of the base stations for each of the home service zones; detecting the pilot signal strengths of the base stations; and, selecting a given number of the base stations in the order of pilot signal strength as the home zone.

According to another object of the invention, an apparatus for providing a home zone database used to determine a charging rate for a call connection with a mobile station within a mobile telecommunications network, comprising: a first storing means for storing data associated with a plurality of base stations, geographic data, system parameters, and antenna information of said mobile network; a simulating means for simulating a communication coverage for said base stations using the data stored in said first storing means; a detecting means for detecting the pilot signal strength of said base stations simulated by said simulating means; a second means for storing said detected pilot signal strength according to each of said base station; and, a sorting means for selecting a predetermined number of said base stations in the order of pilot signal strength, said selected predetermined base stations are stored in said home zone database.

The foregoing and other objects, features, and advantages of the invention will be apparent from the following, more detailed description of preferred embodiments as illustrated in the accompanying drawings in which reference characters refer to the same parts throughout the various views. The drawings are not necessarily to scale, the emphasis instead placed upon illustrating the principles of the invention.

BRIEF DESCRIPTION OF THE ATTACHED DRAWINGS

DETAILED DESCRIPTION OF THE PREFERRED EMBODIMENT

In the following description, for purposes of explanation rather than limitation, specific details are set forth such as the particular architecture, interfaces, techniques, etc., in order to provide a thorough understanding of the present invention. However, it will be apparent to those skilled in the art that the present invention may be practiced in other embodiments that depart from these specific details. For the purpose of clarity, detailed descriptions of well-known devices, circuits, and methods are omitted so as not to obscure the description of the present invention with unnecessary detail.

Figure 1:
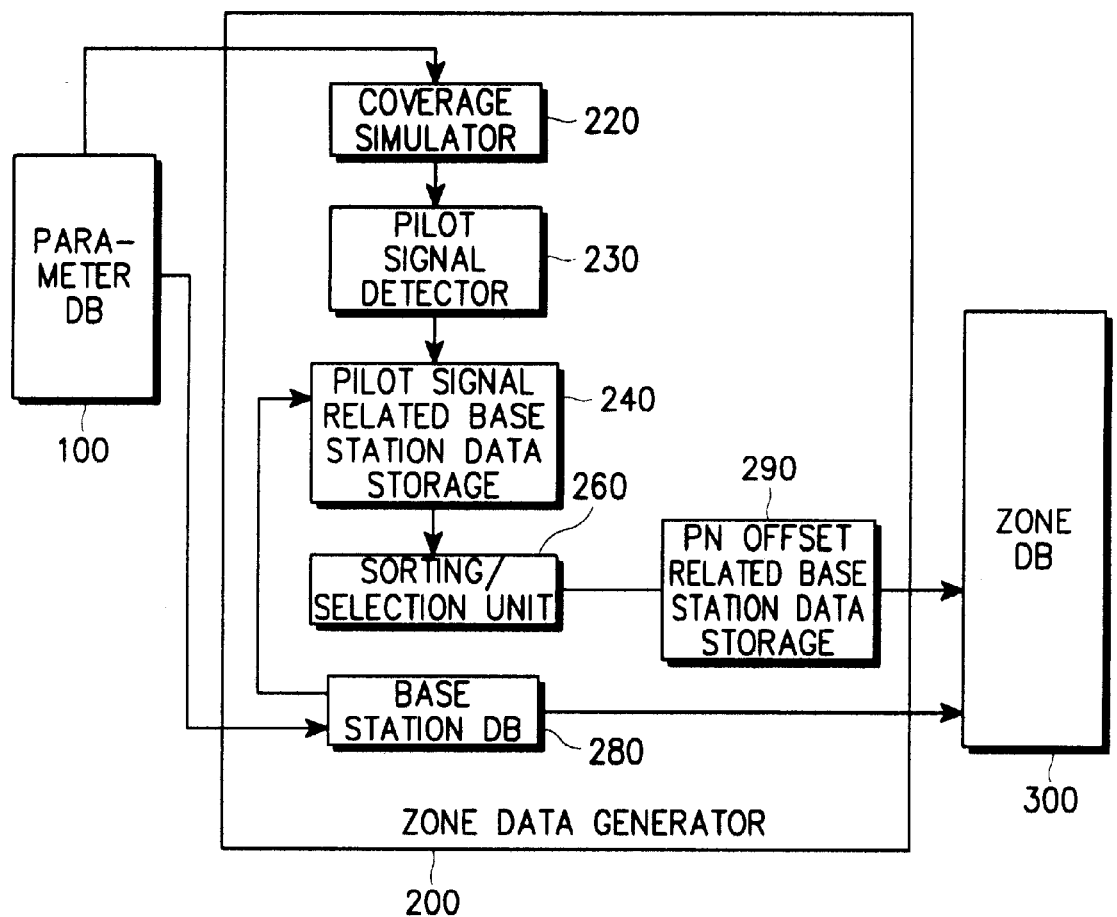
FIG. 1 is a block diagram for illustrating the structure of an apparatus for constructing a zone database for providing home zone services in a mobile communication system according to the present invention.

With reference to FIG. 1, according to the embodiment of the present invention, a parameter database (DB) 100 is provided to store various information used for simulating coverage area, such as system parameters, base stations, geographic data, antennas, etc. A zone data generator 200 includes a coverage simulator 220, a pilot signal detector 230, a pilot signal related base station data storage 240, a sorting/selection unit 260, a base station DB 280, and a PN offset related data base storage 290.

The coverage simulator 220 makes a coverage simulation of each base station by using the information stored in the parameter DB 100. In this case, the operational unit is bin. It is well known in the art that information contained in the parameter DB 100 can be represented in a bin. Through a binning process, bins of various data points are formed based on the information stored in the parameter DB 100. Bin positions are determined from the bins. Bin positions define the order of bins along each discretized axis and can be determined from bin numbers associated with the bins. The pilot signal detector 230 detects the pilot signal of each base station in bin unit. The pilot signal related base station data storage 240 then stores the detected pilot signal level of the corresponding base station in a given bin position. Here, the PN offset of the base station is also included in the base station data 240. The PN offset is utilized to discern between base stations associated with users. Thus, the generated data stored in the pilot signal related base station data storage 240 includes the pilot signal strength, PN offset, and base station data. The base station DB 280 stores the base station data to distinguish between base stations. The sorting/selection unit 260 in turn selects a predetermined number (e.g., 8) of pilot signals in the order of pilot signal strength. The PN offset related base station data storage 290 performs data arrangement according to the data format demanded by the zone DB 300, which stores the zone data files received from the PN offset related base station data storage 290. Accordingly, each bin position, defining a home zone, is represented by the data processed according to the above process to be stored in the zone DB 300.

Figure 2:
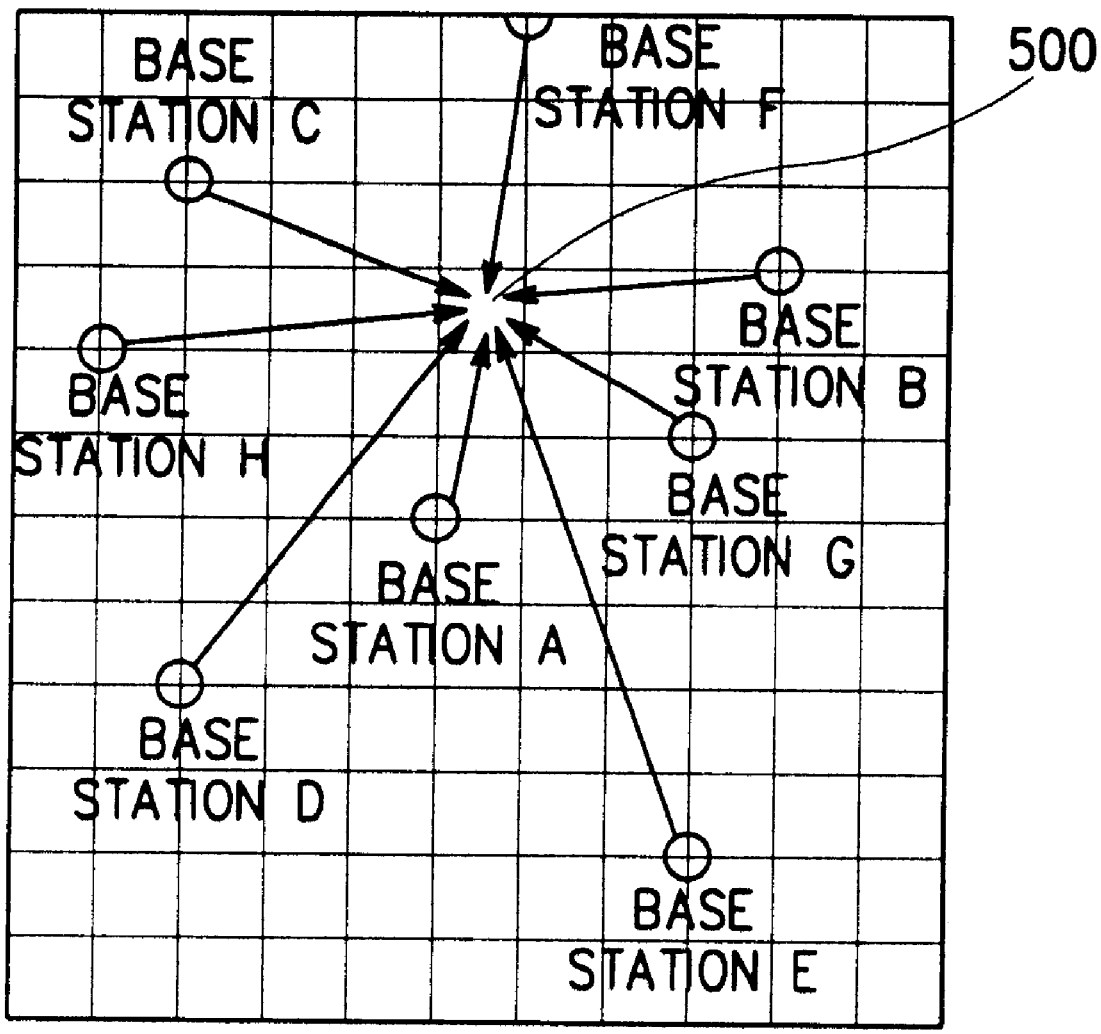
FIG. 2 is a diagram for illustrating the division of a service area into a plurality of home service zones, and the distribution of the base stations whose pilot signals are detected by a particular home zone.

FIG. 2 illustrates how each bin position is processed using the above-described means. The coverage simulator (RSSI detection simulator) 220, as shown in FIG. 1, determines the home zone 500 based on the pilot signal strength received from the surrounding base stations A to H. A predetermined number of the surrounding base stations in the order of pilot signal strength is selected according to the embodiment of the present invention.

Figure 3:
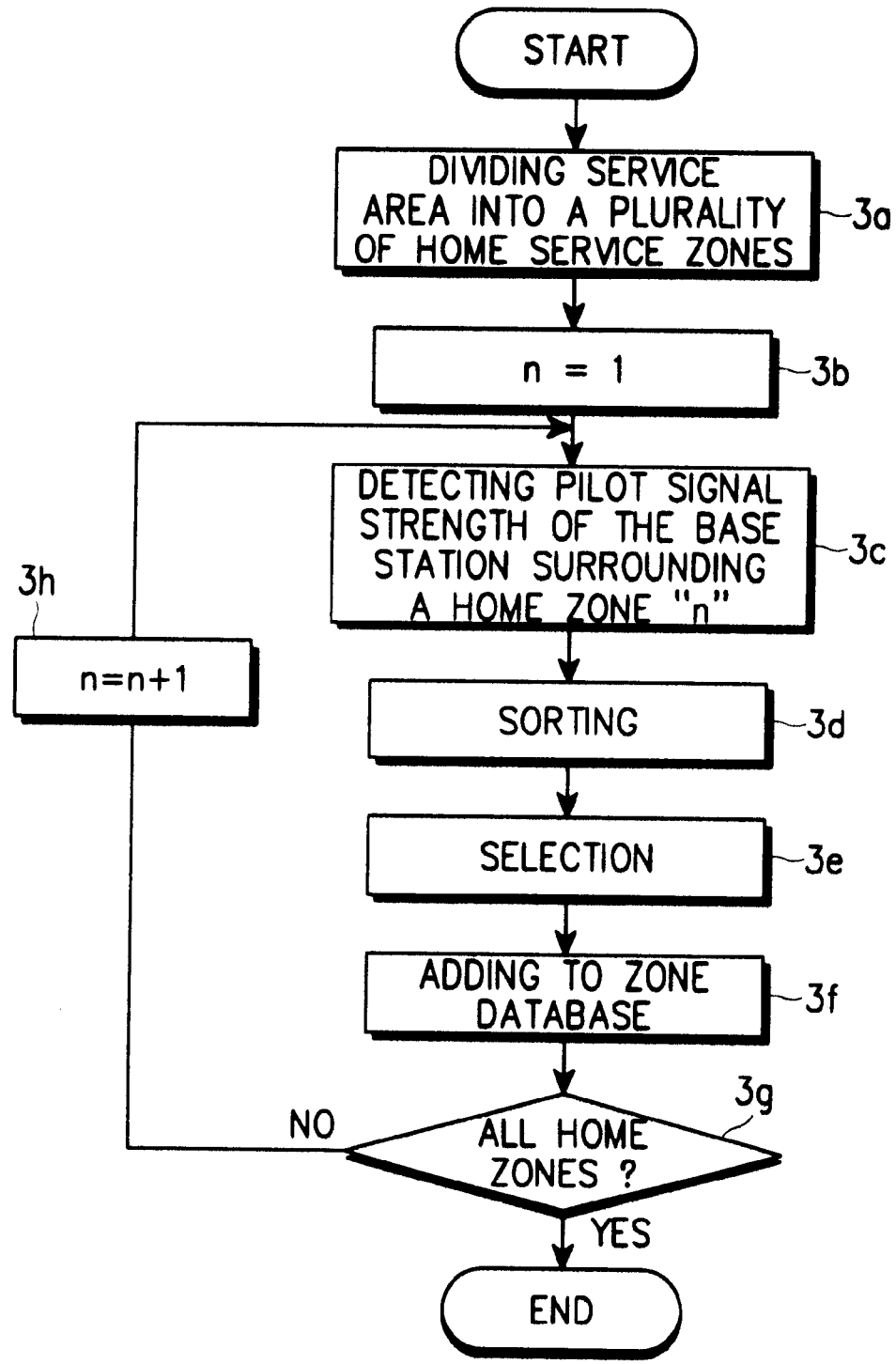
FIG. 3 is a flow chart for illustrating the process of constructing a zone database for providing home zone services according to the present invention.

FIG. 3 further illustrates the process of constructing a zone database 300 to tabularize home zone services according to the present invention. Referring to FIG. 3, the zone data generator 200 initially divides a service area into a plurality of home service zones in the unit of a bin, in step 3a. By setting the home zone identification variable "n" to 1 in step 3b, the coverage simulation is initially made for the first home zone to detect the pilot signal strengths of the surrounding base stations in step 3c. Detected pilot signals from the respective base stations are sorted according to their strength in step 3d and a predetermined number of the base stations (i.e., 8) is selected in step 3e in the order of pilot signal strength. The selected base stations defines the home zone corresponding to the one of the divided plurality of home service zones in step 3f. More specifically, the base station data with the PN offsets of the selected base stations are retrieved from the base station DB 280 during the process of preparing the zone database. If all home zones are not detected for all divided home service zones in step 3g, the steps 3c to 3f are repeated until the home zone identification variable "n" becomes equal to the total number of divided home service zones through step 3h.

The zone database constructed as describe above is kept in the base station or control center so that a comparison can be made to determine whether the mobile station is located within the home zone or not. Accordingly, different billing scheme can be applied to the mobile subscriber.

Figure 4:
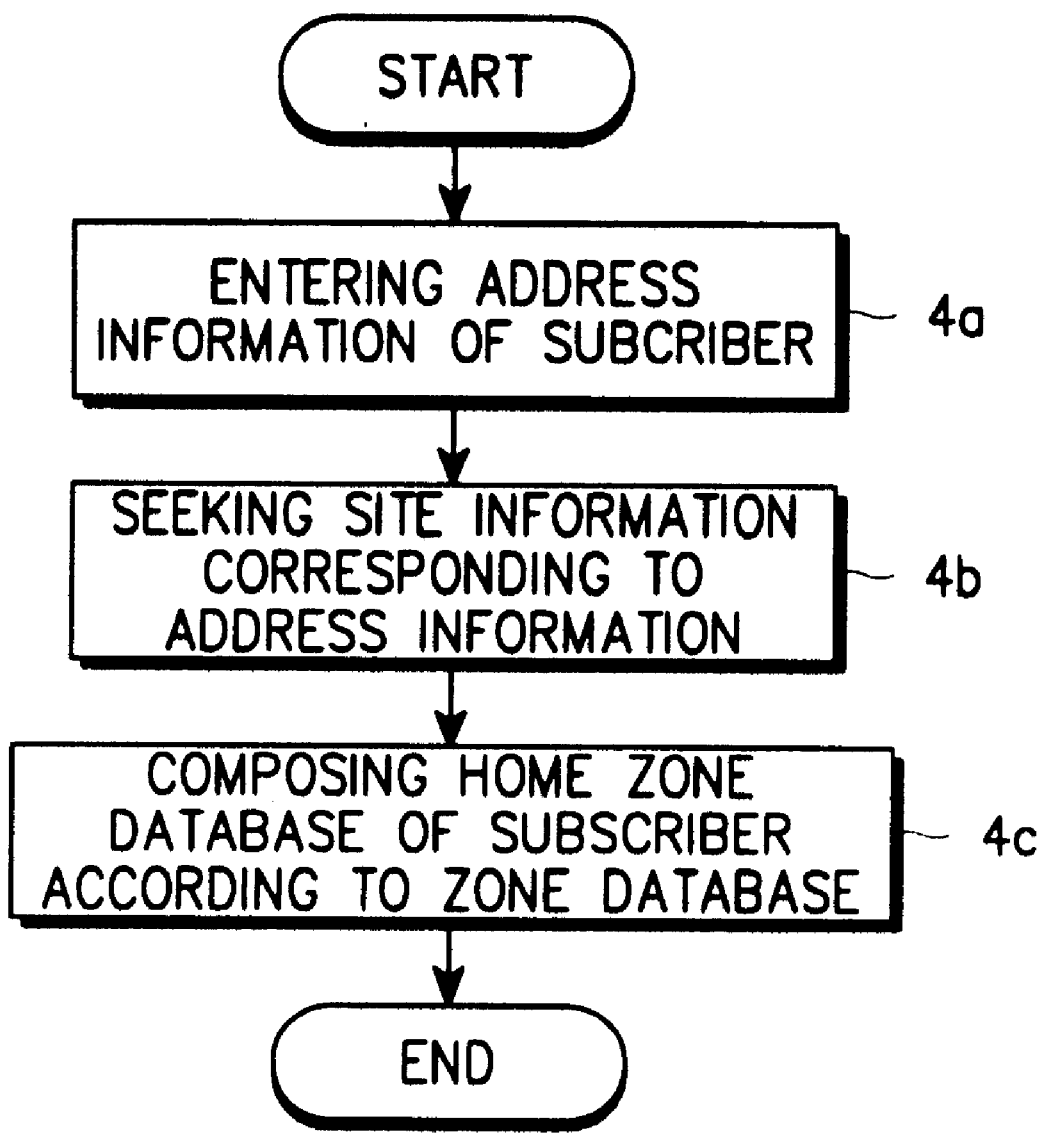
FIG. 4 is a flow chart for illustrating the process of determining the home zone database of a subscriber according to the present invention; and, Fig. 5 is a flow chart for illustrating the process of providing home zone services based on a zone database according to the present invention.

FIG. 4 describes the process of determining the home zone area of a mobile subscriber. As shown in FIG. 4, the control center enters the address information of the mobile subscriber who is seeking the home zone services in step 4a. It also determines the site information of the subscriber corresponding to the address information using the GIS (Geographic Information System) tool in step 4b. In step 4c, the zone database 300 is searched to retrieve the base station information corresponding to the determined site information. Here, a given number base stations, as determined in FIG. 3, that is assigned to the corresponding site information is retrieved to construct the home zone database for the subscriber. Thus, the home zone database will include a given number, e.g., 8, of the base stations. It should be noted that the zone DB 300 can be used to define a home zone for a subscriber as dictated by the operator.

Figure 5:
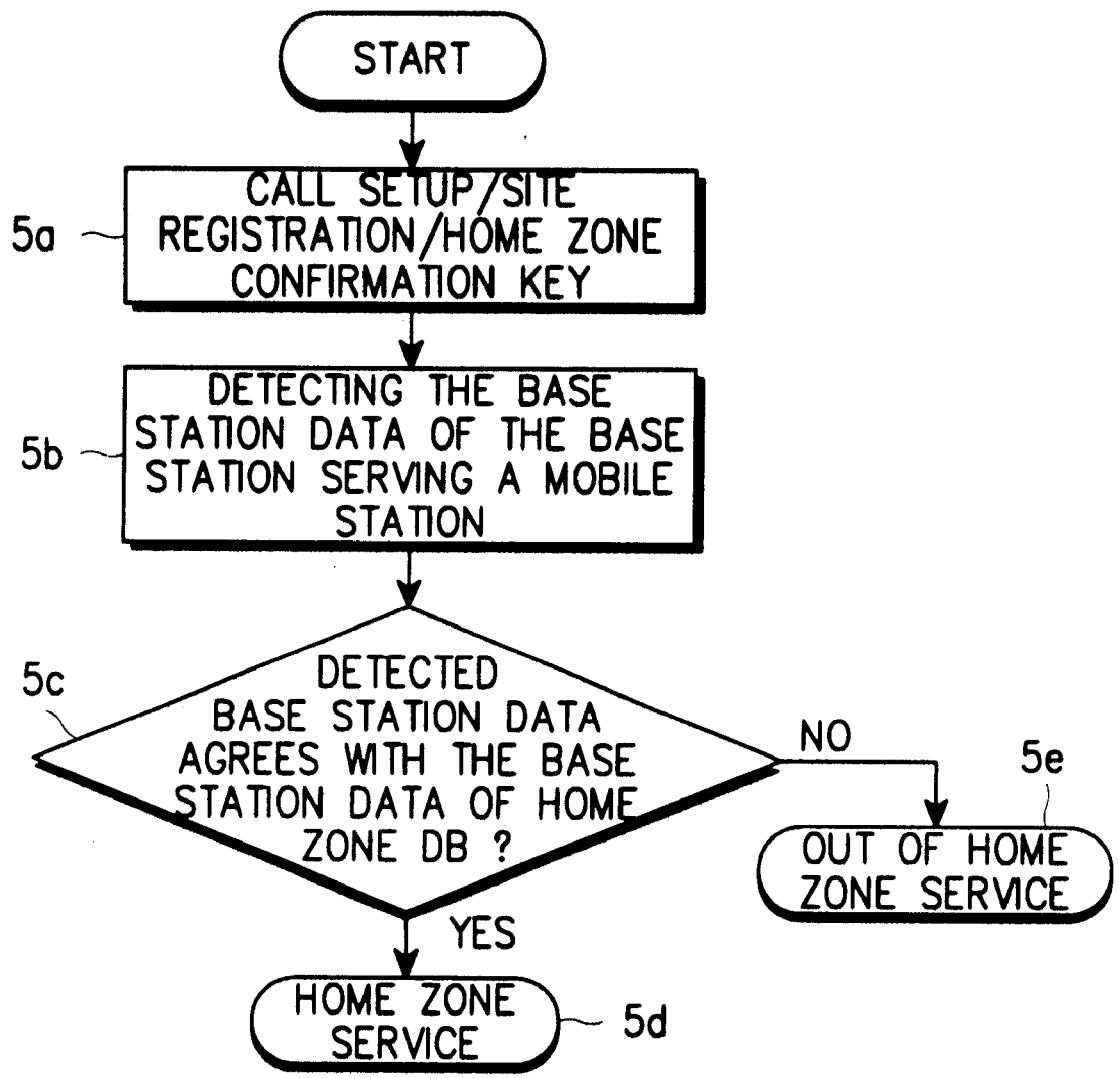

FIG. 5 illustrates the process of providing the home zone services using the zone database. The control center determines in step 5a whether there is a call setup request, a site registration demand, or the activation of a home zone confirmation key (e.g., *69) from a mobile station. If so, the control center detects, in step 5b, the base station information to identify the base station serving the requesting mobile station. The base station information includes site ID, sector ID, etc. In step 5c, the control center determines whether the detected base station information is included in the home zone DB that is created in FIG. 4. The home zone database also includes site ID, sector ID, etc. If so, the control center determines in step 5d that the subscriber is located within the registered home zone and applies a first price rate, e.g., ordinary wired telephone price rate. Otherwise, the control center determines in step 5e that the subscriber is located outside the home zone and applies a second price rate, e.g., mobile telephone price rate.

As explain, the present invention provides the means for constructing a zone database for providing the home zone communication services. While the present invention has been described in connection with specific embodiments accompanied by the attached drawings, it will be readily apparent to those skilled in the art that various changes and modifications may be made thereto without departing the gist of the present invention.

What is claimed is:

1. A method for constructing a zone database for charging a home zone rate to a subscriber of a mobile communications system, said method comprising the steps of:
   (a) dividing a service area into a plurality of home service zones;
   (b) simulating a communication coverage for a plurality of base stations located within each of said home service zone;
   (c) detecting a pilot signal strength of said each base station;
   (d) selecting a predetermined number of said base stations in the order of said detected pilot signal strength, wherein said predetermined base stations defines a home zone; and,
   (e) storing said selected base stations in said home zone database.

2. The method as defined in claim 1, further comprising the step of repeating said steps (b), (c), (d), and (e) for each of said plurality of said base stations.

3. The method as defined in claim 1, further comprising the steps of:
   (i) receiving a request to establish a call connection from said subscriber;
   (ii) detecting a new base station in communication with said subscriber;
   (iii) determining whether said new base station is one of said predetermined base stations in said step (d); and
   if yes,
   applying a first charge rate for said call connection;
   otherwise,
   applying a second charging rate for said call connection.

4. The method as defined in claim 3, wherein said first charging rate is substantially lower than said second charging rate.

5. The method as defined in claim 1, wherein said step (c) comprises the step of detecting a PN offset of said base station.

6. A method for applying different charging rate for a mobile call connection within a mobile telecommunications network, said method comprising the steps of:
- (a) receiving a request to establish a call connection from a subscriber;
- (b) detecting a new base station in communication with said subscriber;
- (c) determining an address information of said subscriber requesting said call connection;
- (d) determining a site information corresponding to said determined address information using a GIS (Geographical Information System) software;
- (e) retrieving a predetermined number of base stations which corresponds to said determined site information from a zone database;
- (f) determining whether said base station corresponds to one of said predetermined base stations retrieved from said zone database; and if yes,
  applying a first charging rate for said call connection
otherwise,
  applying a second charging rate for said call connection.

7. The method as defined in claim 6, wherein said first charging rate is substantially lower than said second charging rate.

8. The method as defined in claim 6, wherein said zone database includes a set of said predetermined number of said base stations corresponding to a plurality of home service zones in the order of pilot signal strength.

9. A system for providing a home zone database used to determine a charging rate for a call connection with a mobile station within a mobile telecommunications network, comprising:

a first storing means for storing data associated with a plurality of base stations, geographic data, system parameters, and antenna information of said mobile network;

a simulating means for simulating a communication coverage for said base stations using the data stored in said first storing means;

a detecting means for detecting the pilot signal strength of said base stations simulated by said simulating means;

a second means for storing said detected pilot signal strength according to each of said base station; and a sorting means for selecting a predetermined number of said base stations in the order of pilot signal strength, said selected predetermined base stations are stored in said home zone database.

10. The system as defined in claim 9, wherein each of said selected base station is associated with a corresponding charging rate.

11. The system as defined in claim 9, wherein said second means includes a PN offset for each of said base station.

12. The system as defined in claim 9, wherein said home zone database is created according to the following steps:

simulating a communication coverage area for each said base station using said simulating means;

detecting a relative pilot signal strength of said each base station using said detecting means;

determining a predetermined number of said base stations in the order of said detected pilot signal strength using said sorting means; and storing said predetermined base stations in said home zone database.

* * * * *